United States Patent
Guiassa et al.

(10) Patent No.: US 12,508,679 B2
(45) Date of Patent: Dec. 30, 2025

(54) SYSTEM AND METHOD FOR REPAIRING A HOUSING FOR A GEARBOX

(71) Applicant: Pratt & Whitney Canada Corp., Longueuil (CA)

(72) Inventors: Rachid Guiassa, Longueuil (CA); Carl Gagne, Beloeil (CA); Martin Bouffard, Ste-Catherine (CA)

(73) Assignee: Pratt & Whitney Canada Corp., Longueuil (CA)

( * ) Notice: Subject to any disclaimer, the term of this patent is extended or adjusted under 35 U.S.C. 154(b) by 399 days.

(21) Appl. No.: 18/202,429

(22) Filed: May 26, 2023

(65) Prior Publication Data
US 2024/0391037 A1    Nov. 28, 2024

(51) Int. Cl.
*B23P 6/00*    (2006.01)
*F16H 57/00*    (2012.01)

(52) U.S. Cl.
CPC ........ *B23P 6/00* (2013.01); *F16H 2057/0068* (2013.01)

(58) Field of Classification Search
None
See application file for complete search history.

(56) References Cited

U.S. PATENT DOCUMENTS

| | | |
|---|---|---|
| 5,898,590 A | 4/1999 | Wampler |
| 9,952,580 B2 | 4/2018 | Bode |
| 10,500,678 B2 | 12/2019 | Dong |
| 2008/0250659 A1 | 10/2008 | Bellerose |
| 2011/0131781 A1 | 6/2011 | Smith |
| 2015/0323922 A1 | 11/2015 | Fletcher |
| 2018/0112559 A1 | 4/2018 | Wintgens |
| 2020/0340454 A1* | 10/2020 | Manikas ................. B23P 6/002 |

FOREIGN PATENT DOCUMENTS

CN    113687628 B    11/2022

OTHER PUBLICATIONS

EP search report for EP24178086.5 dated Oct. 1, 2024.

* cited by examiner

*Primary Examiner* — Ryan A Jarrett
(74) *Attorney, Agent, or Firm* — Getz Balich LLC (57) ABSTRACT

A gearbox repair system includes at least one repair tool and a controller. The controller is configured to control the at least one repair tool to repair a gearbox housing including a first housing body and a second housing body by: controlling the at least one repair tool to repair the first housing body at a first hole of the first housing body by removing a first body material of the first housing body at the first hole, controlling the at least one repair tool to identify a first actual position of the first hole, identifying a compensation vector for the first hole based on the first actual position and a first reference position for the first hole, and controlling the at least one repair tool to repair the second housing body at a second hole of the second housing body by removing a second body material at the second hole such that a second actual position of the second hole is offset from a second reference position of the second hole by the compensation vector.

20 Claims, 8 Drawing Sheets

SYSTEM AND METHOD FOR REPAIRING A HOUSING FOR A GEARBOX

TECHNICAL FIELD

This disclosure relates generally to gearboxes for rotational equipment and, more particularly, to systems and methods for repairing a housing for a gearbox.

BACKGROUND OF THE ART

Propulsion systems for aircraft may gearbox assemblies for use with rotational equipment. For example, a gearbox assembly may be configured to drive a rotational load a reduced rotational speed relative to a drive shaft or other rotational component. Over time, these gearbox assemblies may become worn as a result of operation. After a period of time or after experiencing a sufficient amount of wear, components of a gearbox assembly may be discarded and replaced by new components. While this process of replacing gearbox assembly components may have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a gearbox repair system includes at least one repair tool and a controller. The controller includes a processor in communication with a non-transitory memory storing instructions, which instructions when executed by the processor, cause the processor to control the at least one repair tool to repair a gearbox housing including a first housing body and a second housing body, the first housing body and the second housing body configured to be mounted together to form the gearbox housing, by: controlling the at least one repair tool to repair the first housing body at a first hole of the first housing body by removing a first body material of the first housing body at the first hole, controlling the at least one repair tool to identify a first actual position of the first hole, identifying a compensation vector for the first hole based on the first actual position and a first reference position for the first hole, and controlling the at least one repair tool to repair the second housing body at a second hole of the second housing body by removing a second body material at the second hole such that a second actual position of the second hole is offset from a second reference position of the second hole by the compensation vector.

In any of the aspects or embodiments described above and herein, the gearbox repair system may further include an arm and a tool head. The tool head may be mounted to the arm. The tool head may be configured to selectively retain one or more of the at least one repair tool.

In any of the aspects or embodiments described above and herein, the instructions, when executed by the processor, may further cause the processor to control the arm and the tool head to move the one or more of the at least one tool relative to the gearbox housing.

In any of the aspects or embodiments described above and herein, the at least one tool may include a machining tool.

In any of the aspects or embodiments described above and herein, the at least one tool may include a touch probe.

In any of the aspects or embodiments described above and herein, the instructions, when executed by the processor, may further cause the processor to identify the first actual position using a first center of the first hole and to identify the second actual position using a second center of the second hole.

In any of the aspects or embodiments described above and herein, the gearbox housing may include a plurality of hole pairs. A first hole pair of the plurality of hole pairs may include the first hole and the second hole. The instructions, when executed by the processor, may further cause the processor to perform the step of controlling the at least one repair tool to repair the gearbox housing for each hole pair of the plurality of hole pairs.

According to another aspect of the present disclosure, a method for repairing a housing for a gearbox includes controlling at least one repair tool to repair a first housing body at a first hole of the first housing body, identifying a first actual position of the first hole after controlling the at least one repair tool to repair the first housing body at the first hole, identifying a compensation vector for the first hole based on the first actual position and a first reference position for the first hole, and controlling the at least one repair tool to repair a second housing body at a second hole of the second housing body such that a second actual position of the second hole is offset from a second reference position of the second hole by the compensation vector.

In any of the aspects or embodiments described above and herein, controlling the at least one repair tool to repair the first housing body at the first hole may include removing a first body material of the first housing body at the first hole.

In any of the aspects or embodiments described above and herein, controlling the at least one repair tool to repair the second housing body at the second hole may include removing a second body material of the second housing body at the second hole.

In any of the aspects or embodiments described above and herein, the method may further include identifying a pre-repair first actual position of the first hole prior to controlling the at least one repair tool to repair the first housing body at the first hole. The pre-repair first actual position may be different than the first actual position.

In any of the aspects or embodiments described above and herein, the method may further include identifying a pre-repair second actual position of the second hole prior to controlling the at least one repair tool to repair the second housing body at the second hole. The pre-repair second actual position may be different than the second actual position.

In any of the aspects or embodiments described above and herein, the method may further include generating a repair plan for the second hole using the pre-repair second actual position, the second reference position, and the compensation vector.

In any of the aspects or embodiments described above and herein, controlling the at least one repair tool to repair the second housing body at the second hole may include controlling the at least one repair tool to execute the repair plan for the second hole.

In any of the aspects or embodiments described above and herein, the method may further include verifying the first actual position and the second actual position are within a dimensional tolerance relative to one another.

According to another aspect of the present disclosure, an assembly includes a gearbox repair system. The gearbox repair system includes a platform, an arm, a tool head, at least one repair tool, and a controller. The arm is movable relative to the platform. The tool head is mounted to the arm. The tool head is configured to selectively retain one or more of the at least one repair tool. The controller including a processor in communication with a non-transitory memory storing instructions, which instructions when executed by the processor, cause the processor to: control the at least one repair tool to repair a gearbox housing including a first housing body and a second housing body, by: controlling the at least one repair tool to repair the first housing body at a first hole of the first housing body, controlling the at least one repair tool to identify a first actual position of the first hole after controlling the at least one repair tool to repair the first housing body at the first hole, identifying a compensation vector for the first hole based on the first actual position and a first reference position for the first hole, and controlling the at least one repair tool to repair the second housing body at a second hole of the second housing body such that a second actual position of the second hole is offset from a second reference position of the second hole by the compensation vector.

In any of the aspects or embodiments described above and herein, the at least one tool includes a machining tool and a touch probe.

In any of the aspects or embodiments described above and herein, the instructions, when executed by the processor, may further cause the processor to control the at least one repair tool to identify a pre-repair second actual position of the second hole prior to controlling the at least one repair tool to repair the second housing body at the second hole.

In any of the aspects or embodiments described above and herein, the instructions, when executed by the processor, may further cause the processor to: generate a repair plan for the second hole using the pre-repair second actual position, the second reference position, and the compensation vector and control the at least one repair tool to repair the second housing body at the second hole by controlling the at least one repair tool to execute the repair plan for the second hole.

In any of the aspects or embodiments described above and herein, the assembly may further include the housing including the first housing body and the second housing body. The first housing body and the second housing body may be configured to be mounted together to form the gearbox housing.

The present disclosure, and all its aspects, embodiments and advantages associated therewith will become more readily apparent in view of the detailed description provided below, including the accompanying drawings.

DETAILED DESCRIPTION

Figure 1:
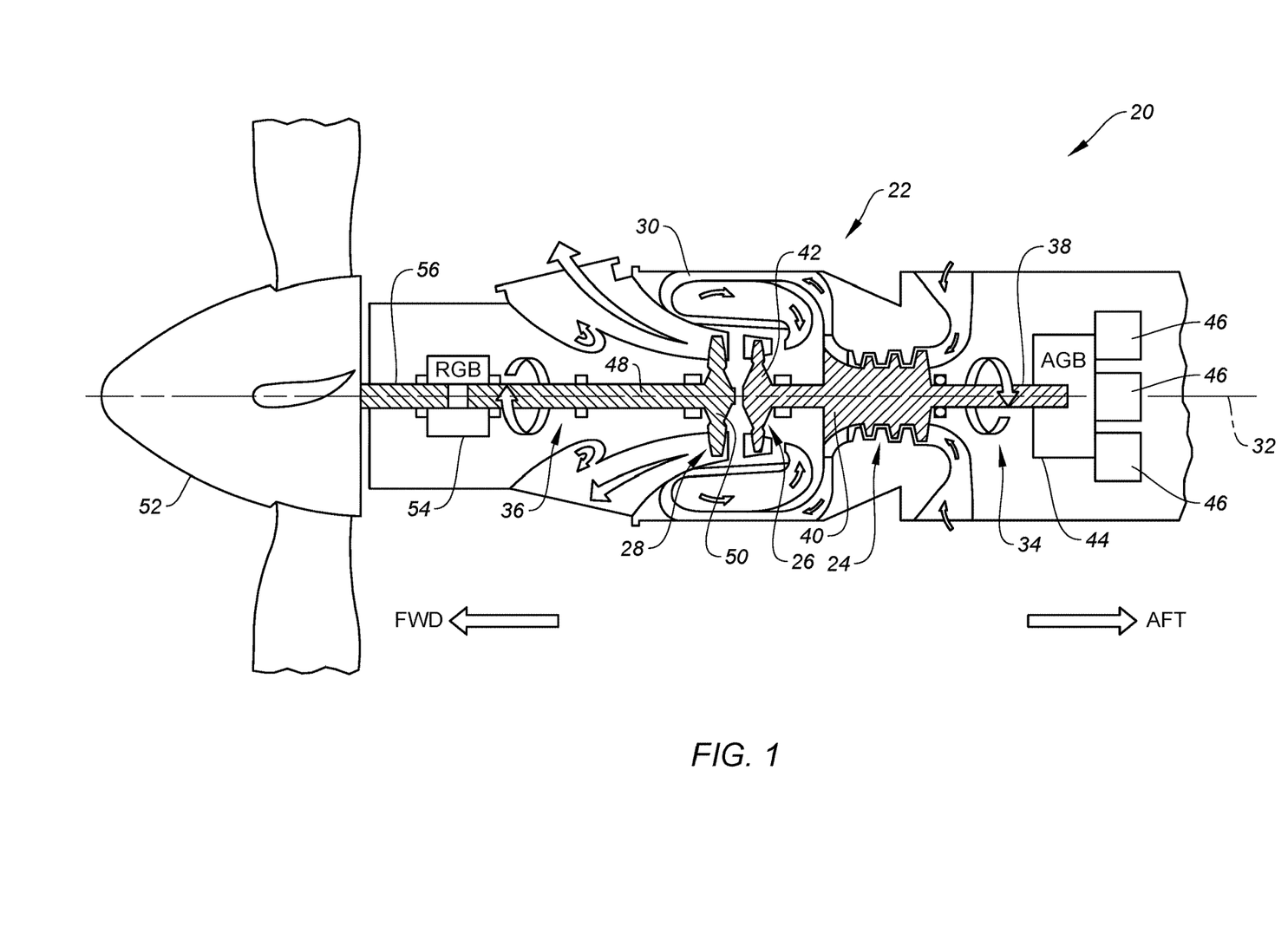
FIG. 1 schematically illustrates a cutaway, side view of a gas turbine engine for an aircraft propulsion system, in accordance with one or more embodiments of the present disclosure.

FIG. 1 illustrates a propulsion system 20 configured for an aircraft. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone).

The aircraft propulsion system 20 of FIG. 1 includes a gas turbine engine 22. The gas turbine engine 22 of FIG. 1 is configured as a turboprop gas turbine engine. The gas turbine engine 22 of FIG. 1 includes a compressor 24, a high-pressure turbine 26, a power turbine 28, and an engine static structure 30. The compressor 24, the high-pressure turbine 26, and the power turbine 28 are arranged along an axial centerline 32 (e.g., a rotational axis) of the gas turbine engine 22. The engine static structure 30 may include, for example, one or more engine cases for the gas turbine engine 22. The engine static structure 30 may additionally include cowlings, bearing assemblies, and/or other structural components of the gas turbine engine 22. The one or more engine cases form, house, and/or structurally support the compressor 24, the high-pressure turbine 26, and the power turbine 28.

Components of the compressor 24, the high-pressure turbine 26, and the power turbine 28, are arranged as a first rotational assembly 34 (e.g., a high-pressure spool) and a second rotational assembly 36 (e.g., a power spool). The first rotational assembly 34 and the second rotational assembly 36 are mounted for rotation about the axial centerline 32 relative to the engine static structure 30.

The first rotational assembly 34 includes a first shaft 38, a bladed compressor rotor 40 for the compressor 24, a bladed first turbine rotor 42 for the high-pressure turbine 26, and a gearbox 44 (e.g., an accessory gearbox). The first shaft 38 interconnects the bladed compressor rotor 40 and the bladed first turbine rotor 42. The gearbox 44 is coupled to the first shaft 38 and one or more accessory loads 46. The gearbox 44 is configured as a speed-changing gearbox to drive the accessory loads 46 at a different rotational speed relative to the first shaft 38. Examples of the accessory loads 46 include a hydraulic pump, an electrical generator (e.g., a starter generator), and a lubricant pump.

The second rotational assembly 36 includes a second shaft 48, a bladed second turbine rotor 50 for the power turbine 28, a propulsor 52, and a gearbox 54. The second shaft 48 is connected to the bladed second turbine rotor 50. The propulsor 52 of FIG. 1 is configured as a propeller for generating thrust for the propulsion system 20 and its associated aircraft. The propulsor 52 of FIG. 1 includes a drive shaft 56. The gearbox 54 is coupled to the second shaft 48 and the drive shaft 56. The gearbox 54 is configured as a speed-reducing gearbox to drive the draft shaft 56 at a reduced rotational speed relative to the second shaft 48.

Figure 2:
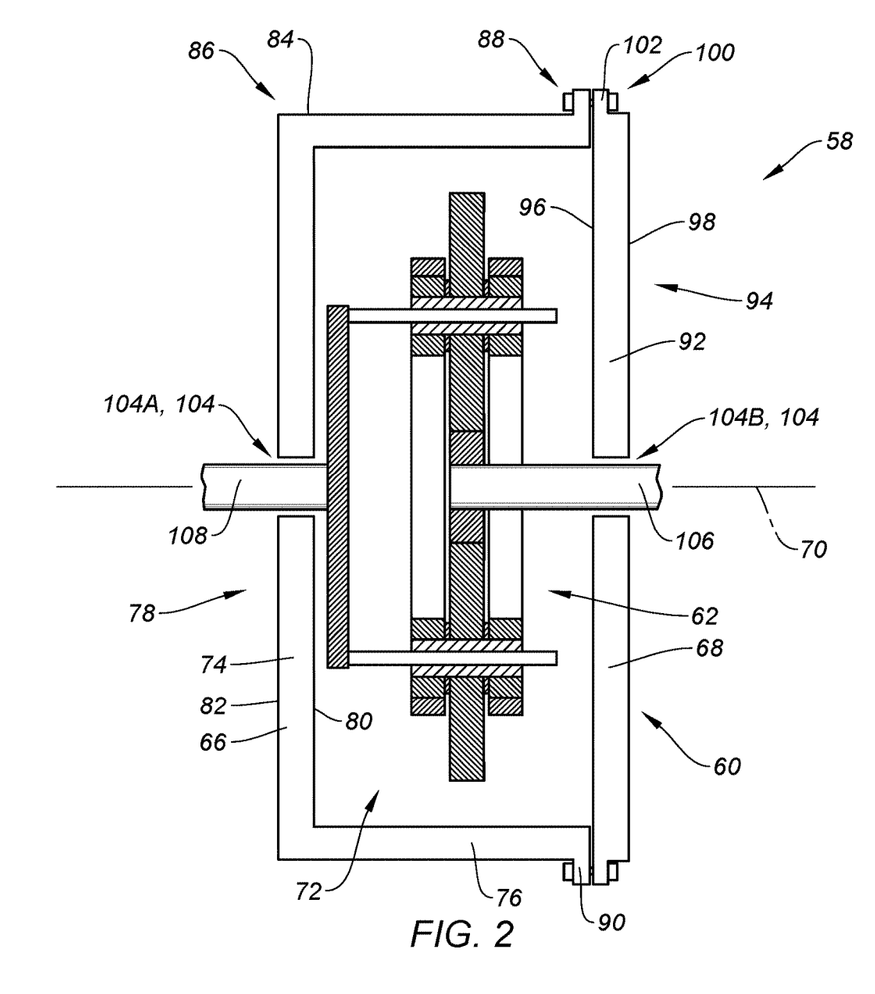
FIG. 2 schematically illustrates a cutaway, side view of a portion of a gearbox, in accordance with one or more embodiments of the present disclosure.
Figure 3:
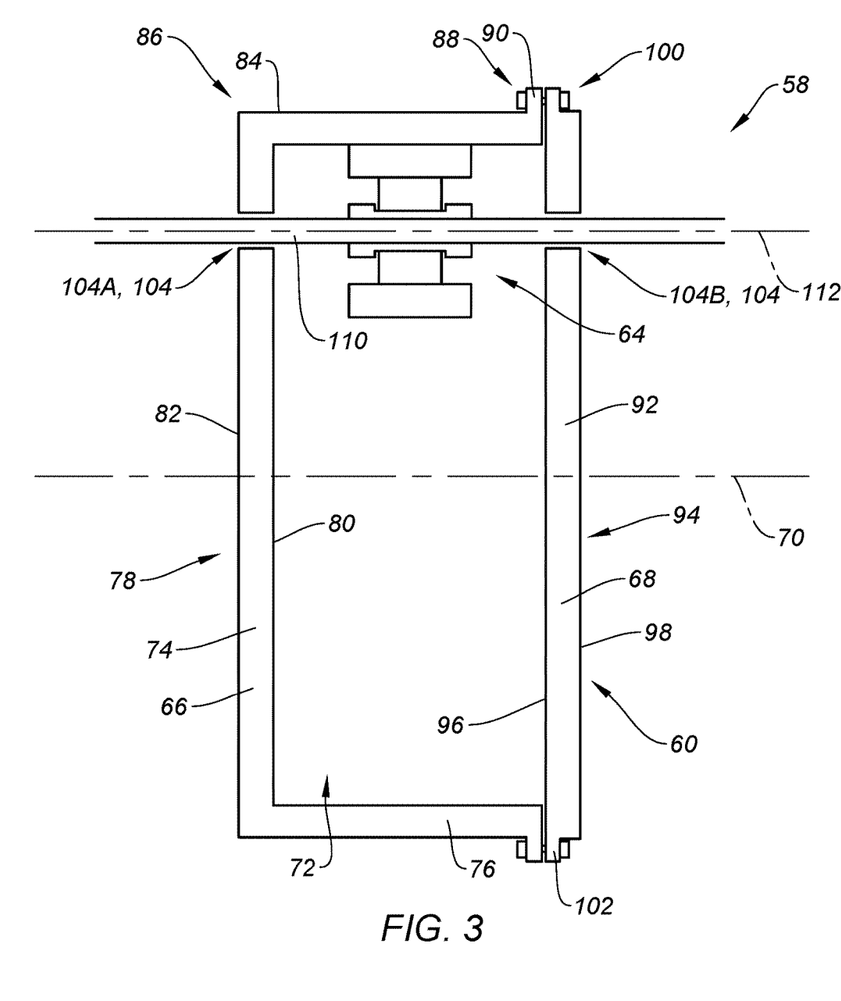
FIG. 3 schematically illustrates a cutaway, side view of another portion of the gearbox of FIG. 2, in accordance with one or more embodiments of the present disclosure.
Figure 4:
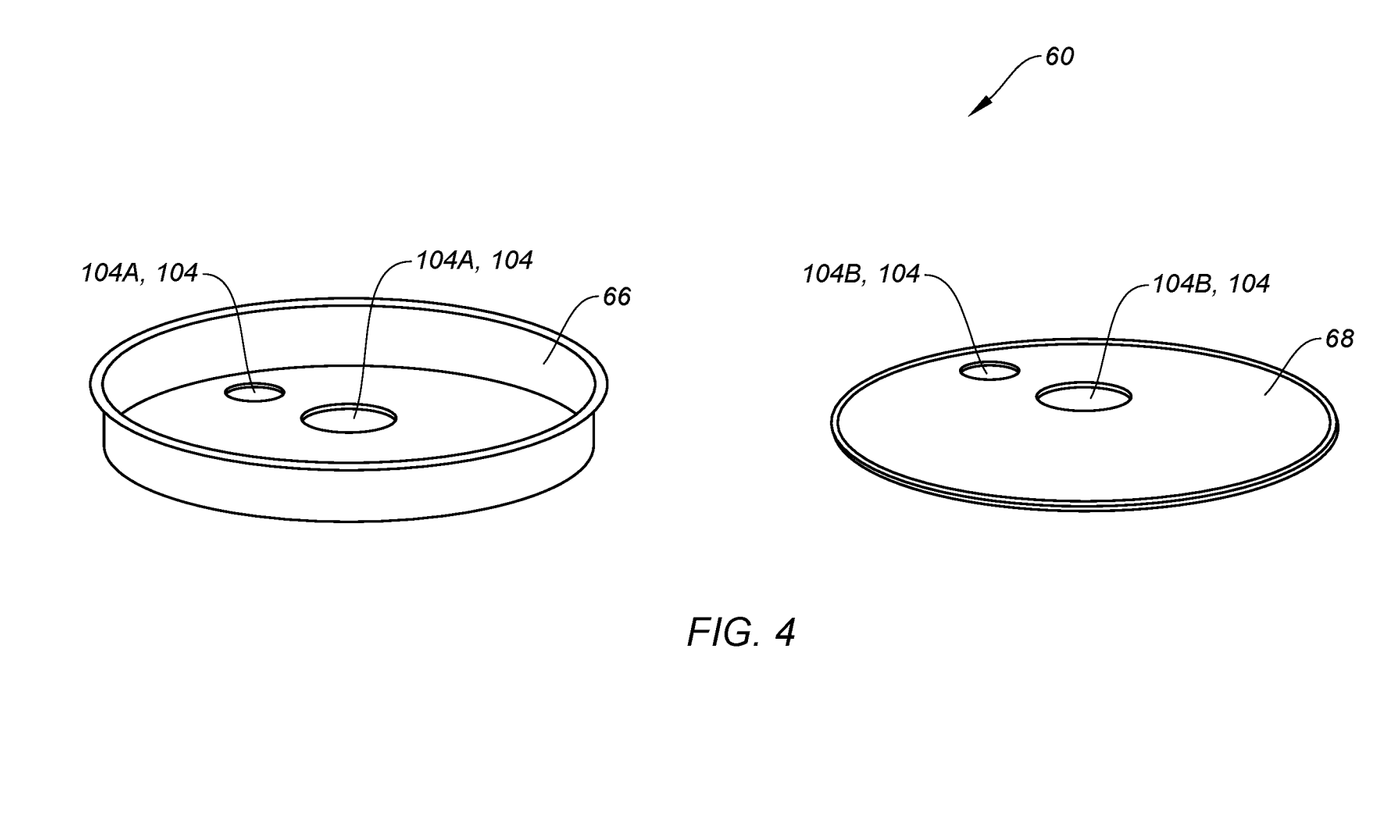
FIG. 4 illustrates a perspective view of a first housing body and a second housing body for the gearbox of FIG. 2 in a disassembled condition, in accordance with one or more embodiments of the present disclosure.

FIGS. 2-4 illustrate a gearbox 58 for a rotational equipment assembly. For example, the gearbox 58 may be configured for use with the first rotational assembly 34 and/or the second rotational assembly 36. The gearbox 58 of the present disclosure, however, is not limited to use with the first rotational assembly 34 or the second rotational assembly 36, or with a gas turbine engine (e.g., the gas turbine engine 22) for an aircraft propulsion system in general. For example, the gearbox 58 may be used with any rotational equipment such as an industrial gas turbine engine, a wind turbine, a water turbine, or any other rotational equipment. The gearbox 58 includes a housing 60 and at least one gear assembly 62. The gearbox 58 may additionally include one or more bearing assemblies 64.

FIGS. 2 and 3 illustrate cutaway, side views of different portions of the housing 60. The housing 60 includes a first axial housing body 66 and a second axial housing body 68 relative to an axial centerline 70 of the gearbox 58. The first axial housing body 66 and the second axial housing body 68 form a gearbox cavity 72 within the gearbox 58 (e.g., axially between the first axial housing body 66 and the second axial housing body 68). FIG. 4 illustrates a perspective view of the first axial housing body 66 and the second axial housing body 68 in a disassembled condition.

The first axial housing body 66 of FIGS. 2-4 includes an axial body portion 74 and a radial body portion 76. The axial body portion 74 forms a first axial end 78 of the gearbox 54. The axial body portion 74 includes an inner side 80, an outer side 82, and a periphery 84. The inner side 80 and the outer side 82 extend (e.g., radially extend) between radially opposing portions of the periphery 84. The inner side 80 forms a portion of the gearbox cavity 72. The periphery 84 extends about (e.g., completely around) the axial centerline 70 to circumscribe the inner side 80 and the outer side 82. The radial body portion 76 extends (e.g., axially extends) between and to a first axial end 86 of the radial body portion 76 and a second axial end 88 of the radial body portion 76. The first axial end 86 is disposed at (e.g., on, adjacent, or proximate) the periphery 84. The radial body portion 76 extends about (e.g., completely around) the axial centerline 70 to circumscribe the gearbox cavity 72. The first axial housing body 66 may include a flange 90 configured for mounting the first axial housing body 66 to the second axial housing body 68 (e.g., using a plurality of mechanical fasteners). The flange 90 may be disposed at (e.g., on, adjacent, or proximate) the second axial end 88. The first axial housing body 66 of FIGS. 2-4 is illustrated with circular and/or cylindrical shape, however, the present disclosure is not limited to any particular shape for the first axial housing body 66.

The second axial housing body 68 of FIGS. 2-4 includes an axial body portion 92. The axial body portion 92 forms a second axial end 94 of the gearbox 54. The axial body portion 92 includes an inner side 96, an outer side 98, and a periphery 100. The inner side 96 forms a portion of the gearbox cavity 72. The periphery 100 extends about (e.g., completely around) the axial centerline 70 to circumscribe the inner side 96 and the outer side 98. The second axial housing body 68 may include a flange 102 configured for mounting the second axial housing body 68 to the first axial housing body 66 (e.g., to the flange 90 using the plurality of mechanical fasteners). The flange 102 may be disposed at (e.g., on, adjacent, or proximate) the periphery 100. The second axial housing body 68 of FIGS. 2-4 is illustrated with circular and/or cylindrical shape, however, the present disclosure is not limited to any particular shape for the second axial housing body 68.

The first axial housing body 66 and the second axial housing body 68 form at least one hole pair 104. Each of the hole pairs 104 includes a first hole 104A formed by the first axial housing body 66 and a second hole 104B formed by the second axial housing body 66. The first hole 104A and the second hole 104B of each of the hole pairs 104 are aligned in an axial direction (e.g., relative to the axial centerline 70). For example, the first hole 104A and the second hole 104B of each of the hole pairs 104 are coaxial with respect to a common center axis (e.g., the axial centerline 70 or a common central axis parallel to the axial centerline 70).

FIG. 2 illustrates a cutaway, side view of a portion of the gearbox 54 including an exemplary configuration of the hole pair 104. The gear assembly 62 of FIG. 2 is disposed within the gearbox cavity 72 between (e.g., axially between) the first axial housing body 66 and the second axial housing body 68. The gear assembly 62 of FIG. 2 is configured as an epicyclic gear assembly (e.g., a planetary gear assembly), however, the gearbox 54 of the present disclosure is not limited to any particular configuration of the gear assembly 62. The gear assembly 62 is coupled to an input shaft 106 and an output shaft 108. The input shaft 106 and the output shaft 108 extending along the axial centerline 70 and the input shaft 106 and the output shaft 108 are configured for rotation about the axial centerline 70. The output shaft 108 extends through the first hole 104A of the hole pair 104 of FIG. 2 and the input shaft 106 extends through the second hole 104B of the hole pair 104 of FIG. 2. The first hole 104A and the second hole 104B of FIG. 2 are aligned in the axial direction and coaxial with respect to the axial centerline 70.

FIG. 3 illustrates a cutaway, side view of another portion of the gearbox 54 including another exemplary configuration of the hole pair 104. FIG. 3 illustrates the bearing assembly 64 disposed within the gearbox cavity 72 between (e.g., axially between) the first axial housing body 66 and the second axial housing body 68. The bearing assembly 64 of FIG. 3 rotationally supports a shaft 110 extending through the gearbox 54. The shaft 110 extends along an axis 112 (e.g., a rotational axis) which may be parallel to the centerline axis 70. The shaft 110 is configured for rotation about the axis 112. The shaft 110 extends through the first hole 104A and the second hole 104B of the hole pair 104 of FIG. 3. The first hole 104A and the second hole 104B of FIG. 3 are aligned in the axial direction and coaxial with respect to the axis 112.

As shown in FIG. 4, the housing 60 may form a plurality of the hole pairs 104. For example, the housing 60 of FIG. 4 includes two hole pairs 104. The present disclosure, however, is not limited to any particular number of hole pairs 104 for the housing 60.

During a course of operation, a gearbox for a rotational assembly (e.g., the gearboxes 44, 54, 58) may experience wear. In particular, a housing of the gearbox may experience wear which may impact the position, form, and material characteristics of portions of the housing. This wear may cause deformation of the housing and may additionally cause changes in the size, shape, orientation, and/or position of the holes (e.g., hole pairs) of the housing, which can negatively affect the mechanical performance and efficiency of the gearbox. For example, due to housing wear, the size, shape, orientation, and/or position of one or more holes of the gearbox housing may diverge from a design size, shape, orientation, and/or position of the holes. Because replacement of a worn gearbox housing can require significant expense, it may be preferable, at least in some cases, to repair gearbox housing wear.

Figure 5:
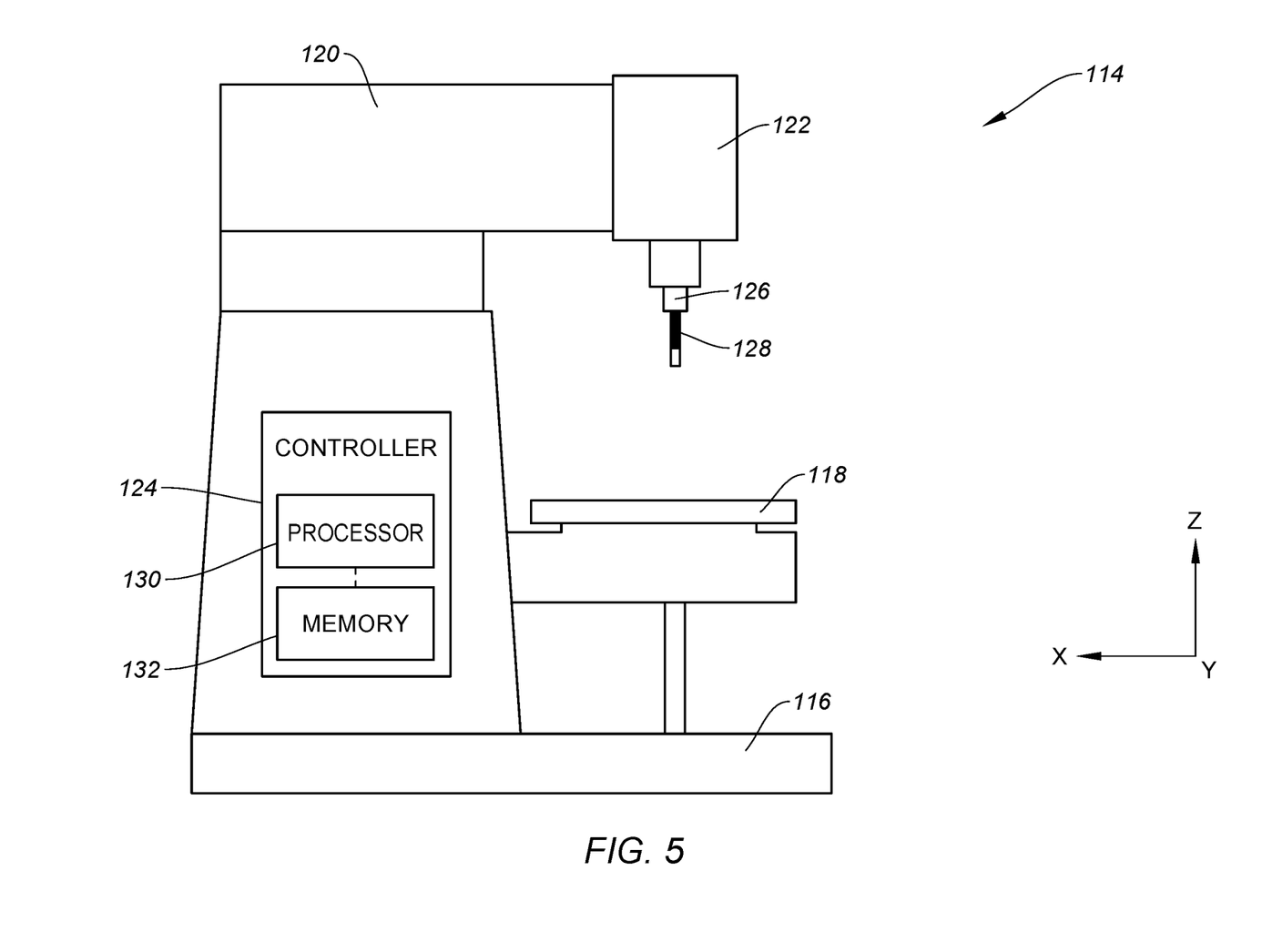
FIG. 5 schematically illustrates a gearbox repair system, in accordance with one or more embodiments of the present disclosure.

FIG. 5 schematically illustrates an exemplary gearbox repair system 114 configured for repairing a gearbox such as, but not limited to, the gearboxes 44, 54, 58. For example, the gearbox repair system 114 may be configured for repairing the housing 60. The gearbox repair system 114 of FIG. 5 is configured as a computer numerical control (CNC) system. The gearbox repair system 114 of FIG. 5 includes a base 116, a platform 118, an arm 120, a tool head 122, and a controller 124.

The platform 118 may be used for positioning and/or supporting a workpiece, such as a component of the housing 60 (e.g., the first housing body 66 or the second housing body 68), for a repair process. The platform 118 may be supported by the base 116. The platform 118 may be movable relative to the base 116. For example, the platform 118 may be movable along one or more of the X-axis, the Y-axis, or the Z-axis to control a position of a workpiece relative to one or more other components of the gearbox repair system 114.

The arm 120 is mounted to the base 116. The tool head 122 is mounted to and supported by the arm 120. The tool head 122 includes at least one spindle 126. The spindle 126 is configured to selectively retain a repair tool 128 for use in a repair process for a workpiece. The arm 120 is moveable relative to the base 116 to control a position of the tool head 122 and, hence, a position of the repair tool 128. The tool head 122 may additionally be movable relative to the arm 120. For example, the arm 120 and the tool head 122 may be configured to translate and/or rotate about one or more axes including the X-axis, the Y-axis, and the Z-axis. The tool head 122 may be configured to rotate the spindle 126 and the repair tool 128 retained by the spindle 126 to effect a machining process using the repair tool 128 or to otherwise position the repair tool 128 relative to a workpiece. The repair tool 128, however, is not limited to a repair tool which can be selectively retained by the tool head 122 (e.g., the spindle 126). For example, the repair tool 128 may be physically separated from the arm 120, the tool head 122, and the spindle 126 but connected in signal communication with the controller 124.

The controller 124 includes a processor 130 connected in signal communication with memory 132. The processor 130 may include any type of computing device, computational circuit, processor(s), CPU, computer, or the like capable of executing a series of instructions that are stored in the memory 132. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The instructions stored in memory 132 may be in the form of G-code, M-code, or another suitable programming language which can be executed by the processor 130. The instructions stored in memory 132 may be generated by computer-aided design (CAD) or computer-aided manufacturing (CAM) software, whereby the physical dimensions of a particular workpiece may be translated into instructions for execution by the processor 130 controlling components of the gearbox repair system 114. The executable instructions may apply to any functionality described herein to enable the gearbox repair system 114 and its components to accomplish the same algorithmically and/or by coordination of the gearbox repair system 114 components. The memory 132 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 124. The controller 124 may include, or may be in communication with, an input device that enables a user to enter data and/or instructions, and may include, or be in communication with, an output device configured, for example to display information (e.g., a visual display or a printer), or to transfer data, etc. Communications between the controller 124 and other electrical and/or electronic components (e.g., controllers, sensors, etc.) may be via a hardwire connection or via a wireless connection. A person of skill in the art will recognize that portions of the controller 024 may assume various forms (e.g., digital signal processor, analog device, etc.) capable of performing the functions described herein.

Figure 6:
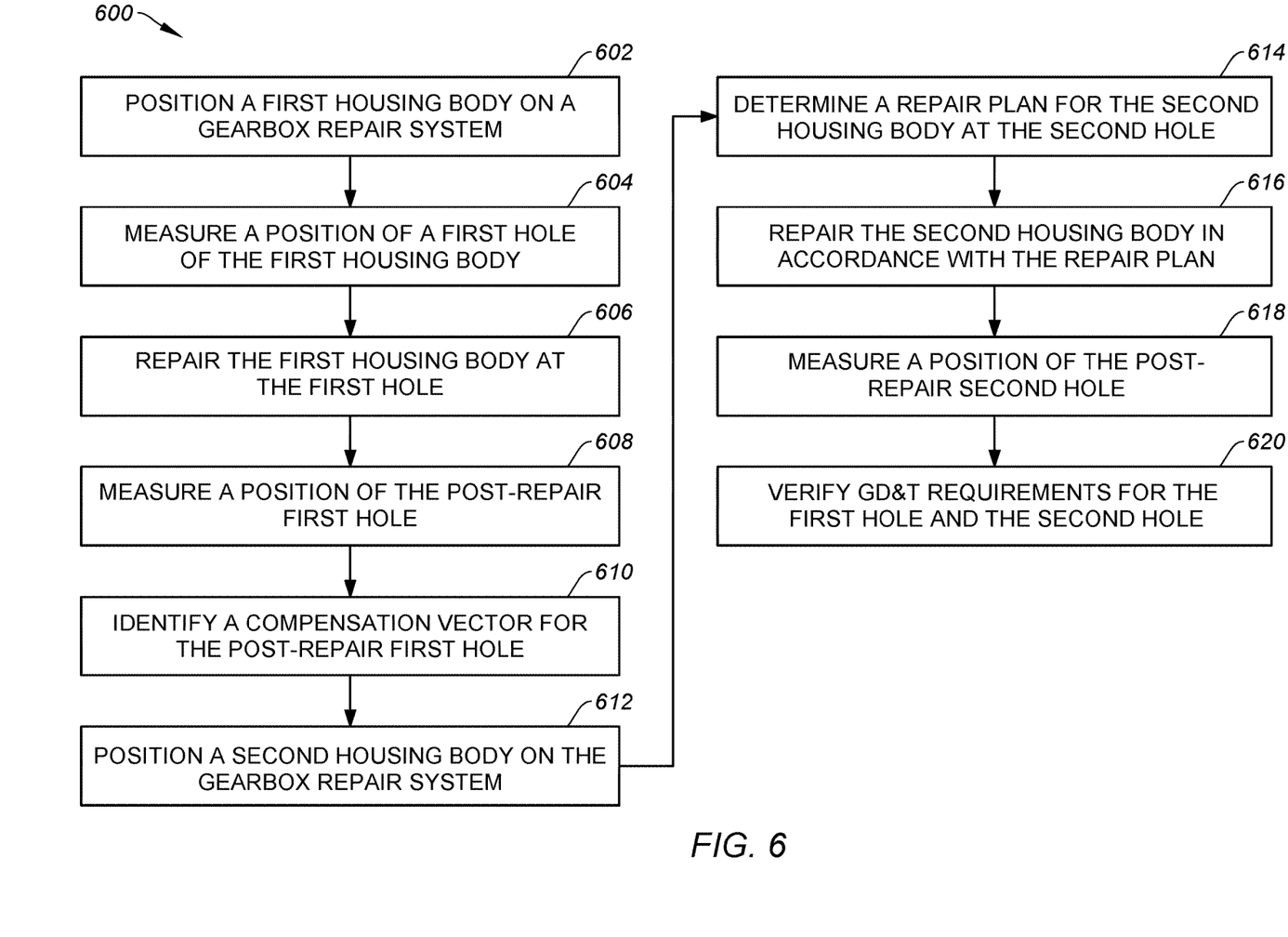
FIG. 6 illustrates a flowchart depicting a method for repairing a housing for a gearbox, in accordance with one or more embodiments of the present disclosure.

Referring to FIG. 6, a Method 600 for repairing a housing (e.g., the housing 60) for a gearbox. FIG. 6 illustrates a flowchart for the Method 600. The Method 600 is described herein with respect to the housing 60 and the gearbox repair system 114. The controller 124 may be used to execute or control one or more steps of the Method 600. For example, the processor 130 may execute instructions stored in memory 132, thereby causing the controller 124 and/or its processor 130 to execute or otherwise control one or more steps of the Method 600. However, it should be understood that the Method 600 is not limited to use with the housing 60 or the gearbox repair system 114 described herein. Unless otherwise noted herein, it should be understood that the steps of Method 600 are not required to be performed in the specific sequence in which they are discussed below and, in some embodiments, the steps of Method 600 may be performed separately or simultaneously. Moreover, performance of the Method 600 may not require performance of each of the steps of Method 600 discussed below.

Step 602 includes mounting or otherwise positioning the first housing body 66 on the gearbox repair system 114 (e.g., on the platform 118). The controller 124 may identify a reference component corresponding to the first housing body 66. The reference component may be a computer-implemented representation of the design configuration for the first housing body 66, which computer-implemented representation may be stored in memory 132. For example, the reference component may be a three-dimensional (3D) CAD or CAM model of the design configuration for the first housing body 66 stored in memory 132. The controller 124 may identify a position and orientation of the first housing body 66 to align the first housing body 66 position and orientation with the reference component. For example, the controller 124 may identify the position and orientation of the first housing body 66 by controlling the repair tool 128 to identify positions of one or more portions of the first housing body 66. The repair tool 128 installed on the tool head 122 may be a touch probe (e.g., a 3D touch probe), a contact scanning probe, a non-contact sensor (e.g., machine vision system, laser scanning system, etc.), or another coordinate-measuring machine (CMM) device configured to identify positions (e.g., Cartesian coordinates) of points or more portions of the first housing body 66.

Figure 7:
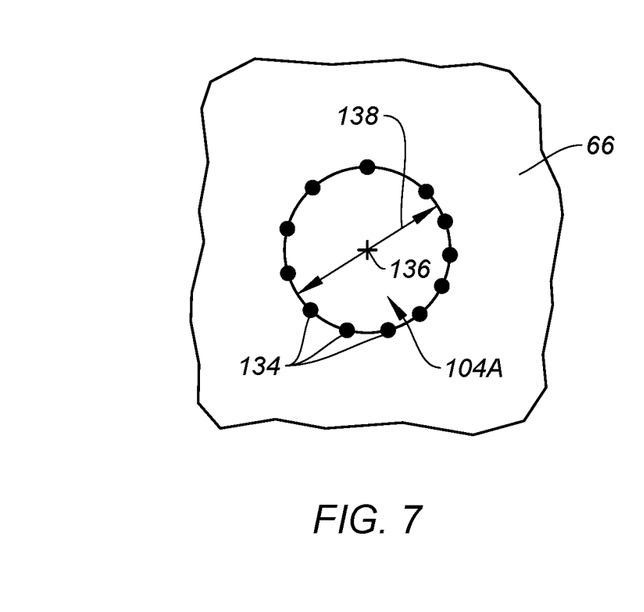
FIG. 7 illustrates a portion of the first housing body of FIG. 4 including a first hole, in accordance with one or more embodiments of the present disclosure.

Step 604 includes measuring an actual position (e.g., a pre-repair actual position) of the first hole 104A for each, or at least one, of the hole pair(s) 104 of the housing 60. FIG. 7 illustrates a portion of the first housing body 66 including the first hole 104A. The first housing body 66 may, of course, include one or more additional first holes 104A for other hole pairs 104, as previously discussed. The controller 124 may identify the actual position of the first hole 104A by controlling the repair tool 128 CMM device to locate positions 134 of one or more portions of the first housing body 66 forming the first hole 104A (e.g., forming an edge of the first hole 104A). Using the located positions 134, the controller 124 may identify one or more geometric characteristics of the first hole 104A such as, but not limited to, a center 136 of the first hole 104A, a diameter 138 of the first hole 104A, and/or an area of the first hole 104A. The controller 124 may identify the actual position of the first hole 104A, for example, using the center 136. Additionally or alternatively, the controller 124 may identify the actual position of the first hole 104A using one or more of the located positions 134. The controller 124 may record the actual position, the located positions, and any other identified geometric characteristics of the first hole 104A in memory 132.

Step 606 includes repairing the first housing body 66 at (e.g., on, adjacent, or proximate) the first hole 104A. In other words, Step 606 includes repairing a portion of the first housing body 66 which forms the first hole 104A to control a position, a shape, a size, and/or another geometric characteristic of the first hole 104A. In general, operational wear of the first housing body 66 (and the second housing body 68; see FIGS. 2-4), as previously discussed, may cause deformation of the first housing body 66 which may, in turn, change a shape and/or relative position of the first hole 104A. For example, the first hole 104A may no longer be round. Repairing the first housing body 66 at (e.g., on, adjacent, or proximate) the first hole 104A may include removing at least some body material of the first housing body 66 at (e.g., on, adjacent, or proximate) the first hole 104A to control a position, a shape, a size, and/or another geometric characteristic of the first hole 104A. For example, the controller 124 may control removal of at least some body material of the first housing body 66 at (e.g., on, adjacent, or proximate) the first hole 104A to restore the roundness of the first hole 104A by controlling the repair tool 128 to remove the body material of the first housing body 66. The repair tool 128 installed on the tool head 122 may be a machining tool or another subtractive manufacturing tool such as, but not limited to, a milling tool, a grinding tool, a drilling tool, a cutting tool, or another suitable machining tool for removing body material from the first housing body 66. Repairing the first housing body 66 at (e.g., on, adjacent, or proximate) the first hole 104A may additionally include adding at least some body material to the first housing body 66 at (e.g., on, adjacent, or proximate) the first hole 104A, for example, to facilitate improved mechanical and/or structural characteristics of the first housing body 66 at the first hole 104A. Adding the body material to the first housing body 66 may be accomplished by additive manufacturing or another suitable material deposition process to deposit a metal or metal alloy body material (e.g., a nickel alloy material) and/or coating (e.g., a diamond powder coating).

Step 608 includes measuring an actual position (e.g., a post-repair actual position) of the first hole 104A for each, or at least one, of the hole pair(s) 104 of the housing 60 after repairing the first housing body 66 at the first hole 104A (see Step 606). Measurement of the post-repair actual position of the first hole 104A may be performed using the process discussed above for measuring the pre-repair actual position of the first hole 104A (see Step 604). Again, using the located positions 134 (see FIG. 7), the controller 124 may identify one or more geometric characteristics of the post-repair first hole 104A such as, but not limited to, the center 136 of the first hole 104A, the diameter 138 of the first hole 104A, and/or the area of the first hole 104A. The controller 124 may identify the post-repair actual position of the first hole 104A, for example, using the center 136. Additionally or alternatively, the controller 124 may identify the post-repair actual position of the first hole 104A using one or more of the located positions 134. The controller 124 may record the post-repair actual position, the located positions 134, and any other identified geometric characteristics of the post-repair first hole 104A in memory 132.

Figure 8:
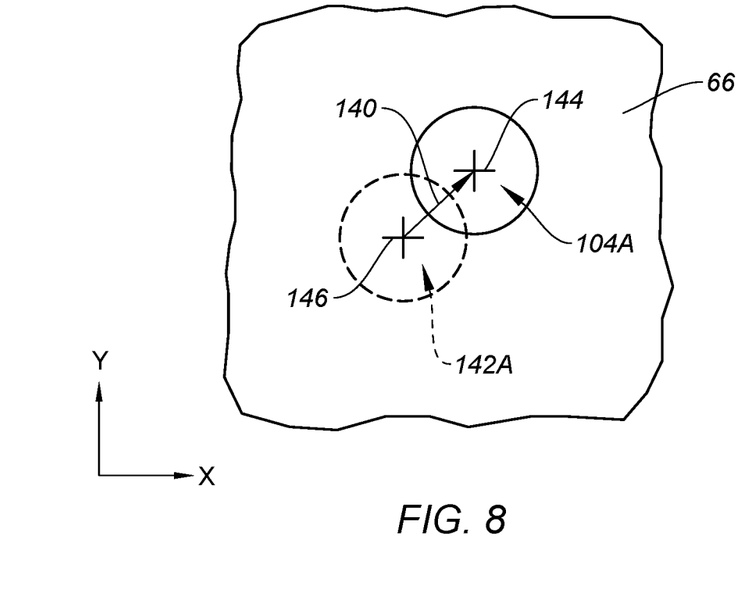
FIG. 8 illustrates the first housing body portion of FIG. 7 including the first hole and a reference first hole, in accordance with one or more embodiments of the present disclosure.

Step 610 includes identifying a compensation vector 140 for the post-repair first hole 104A. FIG. 8 illustrates a portion of the first housing body 66 including the first hole 104A. FIG. 8 further illustrates a reference first hole 142A superimposed on the illustrated portion of the first housing body 66. The reference first hole 142A is a hole of the reference component for the first housing body 66 corresponding to the first hole 104A. In other words, the reference first hole 142A represents a design position, orientation, and size of the first hole 104A on the reference component for the first housing body 66. The portion of the first housing body 66, the first hole 104A, and the reference first hole 142A are illustrated in FIG. 8 relative to an X-Y plane. As a result of wear and/or deformation of the first housing body 66 as well as the repair of the first housing body 66 at the first hole 104A, the location of the first hole 104A may no longer be located at the reference first hole 142A position. The controller 124 may identify the compensation vector 140 by identifying a deviation of a post-repair actual position 144 of the first hole 104A from a reference position 146 of the reference first hole 142A. The post-repair actual position 144 and the reference position 146 of FIG. 8 are identified by the center (e.g., the center 136) of the first hole 104A and the reference first hole 142A, respectively. However, as previously discussed, identification of the actual position of the first hole 104A is not limited to use of the center 136. Similarly, identification of the reference position 146 is not limited to use of a center position of the reference first hole 142A. The controller 124 may identify the compensation vector 140 by measuring or otherwise identifying a magnitude and a direction of the deviation of the post-repair actual position 144 from the reference position 146, as shown in FIG. 8 relative to the X-Y plane. The controller 124 may record the compensation vector 140 in memory 132. While the Steps 602, 604, 606, 608, 610 are described above with respect to the first housing body 66, it should be understood that these Steps may alternatively be performed for the second housing body 68.

Step 612 includes mounting or otherwise positioning the second housing body 68 on the gearbox repair system 114

(e.g., on the platform 118). The controller 124 may identify a reference component corresponding to the second housing body 68. Similar to that discussed above with respect to the first housing body 66 (see Step 602), the reference component may be a computer-implemented representation of the design configuration for the second housing body 68, which computer-implemented representation may be stored in memory 132. For example, the reference component may be a three-dimensional (3D) CAD or CAM model of the design configuration for the second housing body 68 stored in memory 132. The controller 124 may identify a position and orientation of the second housing body 68 to align the second housing body 68 position and orientation with the reference component. For example, the controller 124 may identify the position and orientation of the second housing body 68 by controlling the repair tool 128 to identify positions of one or more portions of the second housing body 68. The repair tool 128 installed on the tool head 122 may be a touch probe (e.g., a 3D touch probe), a contact scanning probe, a non-contact sensor (e.g., machine vision system, laser scanning system, etc.), or another coordinate-measuring machine (CMM) device configured to identify positions (e.g., Cartesian coordinates) of points or more portions of the second housing body 68.

Figure 10:
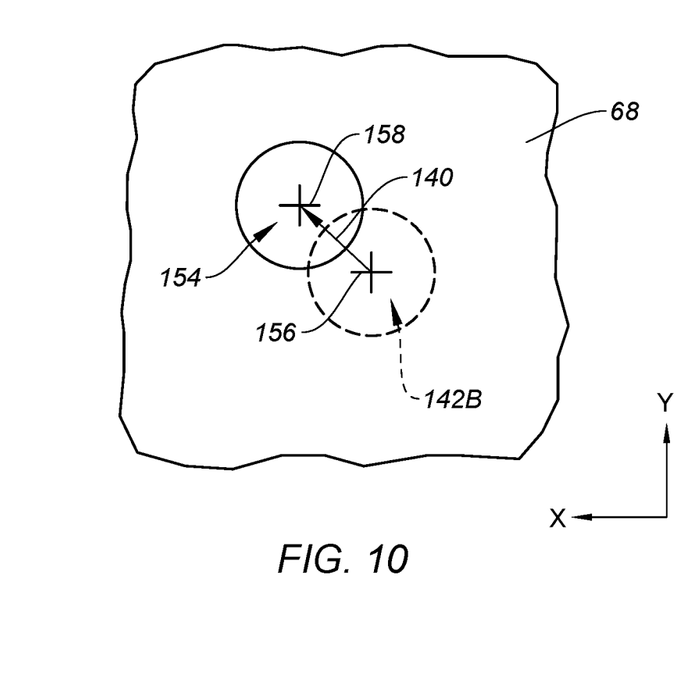
FIG. 10 illustrates the second housing body portion of FIG. 9 including a plan hole and a reference second hole, in accordance with one or more embodiments of the present disclosure.

Step 614 includes determining a repair plan for the second housing body 68 at (e.g., on, adjacent, or proximate) the second hole 104B. The controller 124 may determine the repair plan for the second housing body 68 using the compensation vector 140 identified for the first hole 104A. FIG. 10 illustrates a portion of the second housing body 68 including a plan second hole 154. FIG. 10 further illustrates a reference second hole 142B superimposed on the illustrated portion of the second housing body 68. The reference second hole 142B is a hole of the reference component for the second housing body 68 corresponding to the second hole 104B. In other words, the reference second hole 142B represents a design position, orientation, and size of the second hole 104B on the reference component for the second housing body 68. The portion of the second housing body 68, the plan second hole 154, and the reference second hole 142B are illustrated in FIG. 10 relative to an X-Y plane. As also shown in FIG. 10, the orientation of the X-Y plane may be different from the orientation of the X-Y plane for the first housing body 66 (see FIG. 8), depending on the position of the second housing body 68 with respect to the gearbox repair system 114 (e.g., the platform 118). The controller 124 may determine the repair plan for the second housing body 68 by determining the plan second hole 154 position using the compensation vector 140. The controller 124 may apply the compensation vector 140 to a reference position 156 of the reference second hole 142B to determine a plan position 158 of the plan second hole 154 and, thereby determine a position and orientation of the plan second hole 154 on the second housing body 68 (and with respect to the X-Y plane). The reference position 156 and the plan position 158 of FIG. 10 are identified by the center of the reference second hole 142B and the plan second hole 154, respectively. However, identification of the respective positions of the reference second hole 142B and the plan second hole 154 are not limited to use of the center positions for the reference second hole 142B and the plan second hole 154, respectively. The repair plan for the second housing body 68, including the plan second hole 154, may be represented by instructions (e.g., Cartesian coordinates and/or programming instructions) generated by the controller 124 for execution by the components of the gearbox repair system 114, and stored in memory 132.

Step 616 includes repairing the second housing body 68 at (e.g., on, adjacent, or proximate) the second hole 104B in accordance with the repair plan for the second housing body 68. For example, the controller 124 may control components of the gearbox repair system 114 to repair a portion of the second housing body 68 which forms the second hole 104B, such that the post-repair second hole 104B matches or substantially matches the plan second hole 154 with respect to a position, a shape, a size, and/or another geometric characteristic of the second hole 104B. Repairing the second housing body 68 at (e.g., on, adjacent, or proximate) the second hole 104B may include removing at least some body material of the second housing body 68 at (e.g., on, adjacent, or proximate) the second hole 104B to control a position, a shape, a size, and/or another geometric characteristic of the second hole 104B. For example, the controller 124 may control removal of at least some body material of the second housing body 68 at (e.g., on, adjacent, or proximate) the second hole 104B by controlling the repair tool 128 to remove the body material of the second housing body 68 to execute the repair plan using the repair tool 128. The repair tool 128 installed on the tool head 122 may be a machining tool or another subtractive manufacturing tool such as, but not limited to, a milling tool, a grinding tool, a drilling tool, a cutting tool, or another suitable tool for removing body material from the second housing body 68.

Figure 9:
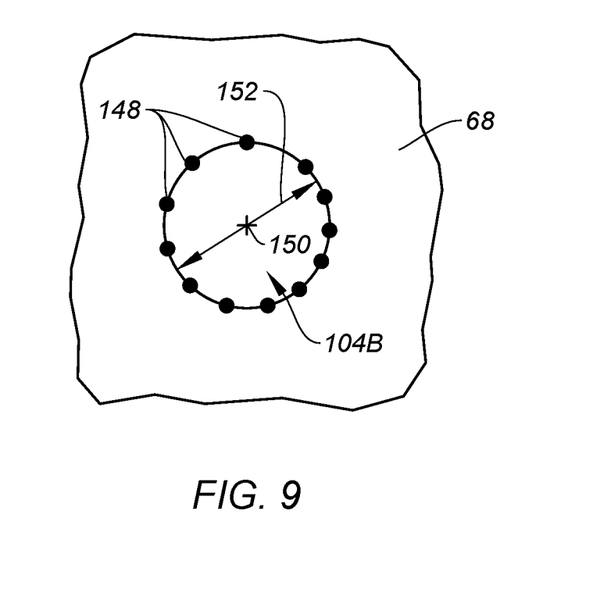
FIG. 9 illustrates a portion of the second housing body of FIG. 4 including a second hole, in accordance with one or more embodiments of the present disclosure.

Step 618 optionally includes measuring an actual position (e.g., a post-repair actual position) of the second hole 104B for each, or at least one, of the hole pair(s) 104 of the housing 60 after repairing the second housing body 68 at the second hole 104B (see Step 618). Measurement of the post-repair actual position of the second hole 104B may be performed using the process discussed above for measuring the pre-repair actual position of the second hole 104B (see Step 614). Again, using the located positions 148 (see FIG. 9), the controller 124 may identify one or more geometric characteristics of the post-repair second hole 104B such as, but not limited to, the center 150 of the second hole 104B, the diameter 152 of the second hole 104B, and/or the area of the second hole 104B. The controller 124 may identify the post-repair actual position of the second hole 104B, for example, using the center 150. Additionally or alternatively, the controller 124 may identify the post-repair actual position of the second hole 104B using one or more of the located positions 148. The controller 124 may record the post-repair actual position, the located positions 148, and any other identified geometric characteristics of the post-repair second hole 104B in memory 132.

Step 620 optionally includes verifying geometric dimensioning and tolerancing (GD&T) requirements for the post-repair first housing body 66 and the post-repair second housing body 68. For example, the controller 124 may verify that the actual position of the post-repair first hole 104A relative to the first housing body 66 is within a tolerance (e.g., a distance threshold) of the actual position of the post-repair second hole 104B relative to the second housing body 68. In this way, the controller 124 may verify that the post-repair first hole 104A and the post-repair second hole 104B may be suitably (e.g., within the tolerance) aligned in the axial direction when the first housing body 66 is installed with the second housing body 68. The controller 124 may additionally verify that the actual positions of the post-repair first hole 104A and the post-repair second hole 104B are within a tolerance (e.g., a distance threshold) of other hole pairs 104 for the housing 60, such that each hole pair 104 for the housing 60 is verified to be parallel to each other hole pair 104 of the housing 60 and/or spaced from each other hole pair 104 of the housing 60 within a tolerance.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A gearbox repair system comprising:
at least one repair tool; and
a controller including a processor in communication with a non-transitory memory storing instructions, which instructions when executed by the processor, cause the processor to:
control the at least one repair tool to repair a gearbox housing including a first housing body and a second housing body, the first housing body and the second housing body configured to be mounted together to form the gearbox housing, by:
controlling the at least one repair tool to repair the first housing body at a first hole of the first housing body by removing a first body material of the first housing body at the first hole;
controlling the at least one repair tool to identify a first actual position of the first hole;
identifying a compensation vector for the first hole based on the first actual position and a first reference position for the first hole; and
controlling the at least one repair tool to repair the second housing body at a second hole of the second housing body by removing a second body material at the second hole such that a second actual position of the second hole is offset from a second reference position of the second hole by the compensation vector.

2. The gearbox repair system of claim 1, further comprising an arm and a tool head, the tool head is mounted to the arm, the tool head is configured to selectively retain one or more of the at least one repair tool.

3. The gearbox repair system of claim 2, wherein the instructions, when executed by the processor, further cause the processor to control the arm and the tool head to move the one or more of the at least one tool relative to the gearbox housing.

4. The gearbox repair system of claim 1, wherein the at least one tool includes a machining tool.

5. The gearbox repair system of claim 1, wherein the at least one tool includes a touch probe.

6. The gearbox repair system of claim 1, wherein the instructions, when executed by the processor, further cause the processor to identify the first actual position using a first center of the first hole and to identify the second actual position using a second center of the second hole.

7. The gearbox repair system of claim 1, wherein the gearbox housing includes a plurality of hole pairs, a first hole pair of the plurality of hole pairs includes the first hole and the second hole, and the instructions, when executed by the processor, further cause the processor to perform the step of controlling the at least one repair tool to repair the gearbox housing for each hole pair of the plurality of hole pairs.

8. A method for repairing a housing for a gearbox, the method comprising:

controlling at least one repair tool to repair a first housing body at a first hole of the first housing body;

identifying a first actual position of the first hole after controlling the at least one repair tool to repair the first housing body at the first hole;

identifying a compensation vector for the first hole based on the first actual position and a first reference position for the first hole; and controlling the at least one repair tool to repair a second housing body at a second hole of the second housing body such that a second actual position of the second hole is offset from a second reference position of the second hole by the compensation vector.

9. The method of claim 8, wherein controlling the at least one repair tool to repair the first housing body at the first hole includes removing a first body material of the first housing body at the first hole.

10. The method of claim 8, wherein controlling the at least one repair tool to repair the second housing body at the second hole includes removing a second body material of the second housing body at the second hole.

11. The method of claim 8, further comprising identifying a pre-repair first actual position of the first hole prior to controlling the at least one repair tool to repair the first housing body at the first hole, the pre-repair first actual position different than the first actual position.

12. The method of claim 8, further comprising identifying a pre-repair second actual position of the second hole prior to controlling the at least one repair tool to repair the second housing body at the second hole, the pre-repair second actual position different than the second actual position.

13. The method of claim 12, further comprising generating a repair plan for the second hole using the pre-repair second actual position, the second reference position, and the compensation vector.

14. The method of claim 13, wherein controlling the at least one repair tool to repair the second housing body at the second hole includes controlling the at least one repair tool to execute the repair plan for the second hole.

15. The method of claim 8, further comprising verifying the first actual position and the second actual position are within a dimensional tolerance relative to one another.

16. An assembly comprising:
a gearbox repair system including a platform, an arm, a tool head, at least one repair tool, and a controller,
the arm is movable relative to the platform,
the tool head is mounted to the arm, the tool head is configured to selectively retain one or more of the at least one repair tool;
the controller including a processor in communication with a non-transitory memory storing instructions, which instructions when executed by the processor, cause the processor to:
control the at least one repair tool to repair a gearbox housing including a first housing body and a second housing body, by:
controlling the at least one repair tool to repair the first housing body at a first hole of the first housing body;
controlling the at least one repair tool to identify a first actual position of the first hole after controlling the at least one repair tool to repair the first housing body at the first hole;
identifying a compensation vector for the first hole based on the first actual position and a first reference position for the first hole; and
controlling the at least one repair tool to repair the second housing body at a second hole of the second housing body such that a second actual position of the second hole is offset from a second reference position of the second hole by the compensation vector.

17. The assembly of claim 16, wherein the at least one tool includes a machining tool and a touch probe.

18. The assembly of claim 16, wherein the instructions, when executed by the processor, further cause the processor to control the at least one repair tool to identify a pre-repair second actual position of the second hole prior to controlling the at least one repair tool to repair the second housing body at the second hole.

19. The assembly of claim 18, wherein the instructions, when executed by the processor, further cause the processor to:
generate a repair plan for the second hole using the pre-repair second actual position, the second reference position, and the compensation vector; and
control the at least one repair tool to repair the second housing body at the second hole by controlling the at least one repair tool to execute the repair plan for the second hole.

20. The assembly of claim 16, further comprising the housing including the first housing body and the second housing body, the first housing body and the second housing body configured to be mounted together to form the gearbox housing.

\* \* \* \* \*